United States Patent
Okuda et al.

(10) Patent No.: US 12,423,083 B2
(45) Date of Patent: Sep. 23, 2025

(54) CODE ADJUSTMENT DEVICE AND CODE ADJUSTMENT METHOD

(71) Applicant: Mitsubishi Electric Corporation, Tokyo (JP)

(72) Inventors: Katsumi Okuda, Tokyo (JP); Yoshihiro Sugiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 178 days.

(21) Appl. No.: 18/284,074

(22) PCT Filed: Apr. 7, 2021

(86) PCT No.: PCT/JP2021/014728
§ 371 (c)(1),
(2) Date: Sep. 26, 2023

(87) PCT Pub. No.: WO2022/215185
PCT Pub. Date: Oct. 13, 2022

(65) Prior Publication Data
US 2024/0152350 A1    May 9, 2024

(51) Int. Cl.
*G06F 9/44* (2018.01)
*G06F 8/65* (2018.01)

(52) U.S. Cl.
CPC .................... *G06F 8/65* (2013.01)

(58) Field of Classification Search
CPC .......... G06F 8/65; G06F 9/451; G06F 3/0647; G06F 8/36; G06F 12/023; G06F 8/427;
(Continued)

(56) References Cited

U.S. PATENT DOCUMENTS 7,093,231 B2 *   8/2006   Nuss ................... G06F 8/31
                                                  717/114
9,477,461 B1 *  10/2016   Korotaev ........... G06F 8/656
(Continued)

FOREIGN PATENT DOCUMENTS

| JP | 2000-155673 A | 6/2000 |
| JP | 2002-132521 A | 5/2002 |
| JP | 2002-524792 A | 8/2002 |

OTHER PUBLICATIONS

International Search Report and Written Opinion mailed on Jun. 29, 2021, received for PCT Application PCT/JP2021/014728, filed on Apr. 7, 2021, 10 pages including English Translation.
(Continued)

*Primary Examiner* — Chuck O Kendall
(74) *Attorney, Agent, or Firm* — XSENSUS LLP

(57) ABSTRACT

A program stop time associated with code adjustment is shortened. A code adjustment device according to a technique disclosed in the present specification of the present application includes a loading unit configured to load an object file that is relocatable, a code adjustment planning unit configured to create a code adjustment plan list using a plurality of elements, each of which is a pair of a position where a code adjustment is to be performed and a corresponding adjustment content in the object file loaded by the loading unit, and, a code adjustment execution unit configured to execute a plurality of code adjustments based on the code adjustment plan list after the code adjustment plan list is created.

10 Claims, 13 Drawing Sheets

(58) Field of Classification Search
CPC .. G06F 8/447; G06F 3/04892; G06F 11/1092; G06F 16/9038; G06F 2201/86; G06F 8/315; G06F 15/7871
See application file for complete search history.

(56) References Cited

U.S. PATENT DOCUMENTS

2001/0034818 A1    10/2001  May et al.
2014/0173245 A1*   6/2014   Ruhe .................... G06F 8/4441
                                                    711/214

OTHER PUBLICATIONS

Notice of Reasons for Refusal mailed on Nov. 9, 2021, received for JP Application 2021-559002, 8 pages Including English Translation.

* cited by examiner

FIG. 2

```
void foo()
{
    ...
}
```

```
void bar()
{
    ...
    foo();
    ...
}
```

```
void main()
{
    ...
    bar();
    ...
}
```

CODE ADJUSTMENT DEVICE AND CODE ADJUSTMENT METHOD

CROSS-REFERENCE TO RELATED APPLICATION

The present application is based on PCT filing PCT/JP2021/014728, filed Apr. 7, 2021, the entire contents of which are incorporated herein by reference.

TECHNICAL FIELD

The technology disclosed in the specification of the present application relates to code adjustment.

BACKGROUND ART

One method to add or modify functionalities in a computer system is through program updates. As a method of updating programs, there are a method of updating the entire program and a method of updating a part of the program. Hereinafter, the latter is also referred to as partial program updates, and it assumes updates at the compilation unit level of the program in particular.

As a means of achieving partial program updates, there is a conventional method of using dynamic libraries. However, there are cases where issues arise, such as decreased execution efficiency or delays associated with the execution of dynamic libraries.

When a program uses a dynamic library, a call to function that exists in the dynamic library is an indirect call. Therefore, calling to a function that exists in the dynamic library is less efficient than regular calling to a function. Also, when a function that exists in the dynamic library is called for the first time, a trampoline code is called. Therefore, calling to a function exists in the dynamic library for the first time entails a delay.

Accordingly, there has been a problem with using dynamic libraries for partial updates of programs, such as an embedded system, where any decrease in execution efficiency or delay cannot be tolerated.

As a means of solving this problem, a method of partially updating a program has conventionally existed using a mechanism similar to static libraries (for example, see Patent Document 1).

For example, in the code adjustment device described in Patent Document 1, the code adjustment units adjust instructions codes using resolved symbol values based on instructions referencing relocatable symbols.

PRIOR ART DOCUMENTS

Patent Document(s)

[Patent Document 1] Japanese Patent Application Laid-Open No. 2000-155673

SUMMARY

Problem to be Solved by the Invention

During program updates, it is necessary for the program being an update target (i.e. the adjustment target) to be temporarily stopped, and for code adjustment (i.e. adjustment of code) to be performed in the program. If code adjustment is performed during execution of a program being the update target, the program can be executed in a state where only some of the instructions that refer to relocatable symbols rewritten. In that case, proper program operation cannot be guaranteed. Therefore, when updating a program, it is necessary to stop the program being the update target.

The shorter the stop time of the above program is, the better the benefit is. For example, in the case of a program that provides services by being periodically executed, if the stop time of the program during updating is sufficiently shorter than the execution cycle, there is no need to stop the service before and after updating the program.

However, there has been a problem that the code adjustment unit described in Patent Document 1, for example, takes time to adjust the instruction code, so it is necessary for the program to be stopped for a long time when updating the program. The instruction code adjustment mentioned above involves scanning through the relocation table to discover all instructions that refer to relocatable symbols and resolving the address (symbol address) of each individual symbol. Symbol addresses are stored in a memory in association with the character string representation of the symbol name. Therefore, to resolve the symbol address, it is necessary to find the symbol address represented by a character string.

As a result, in the conventional instruction code adjustment, it takes for symbol address search process, and code adjustment takes a relatively long time. Along with this, the stop time of the program is also relatively long as well.

The technique disclosed in the specification of the present application has been made in view of the problems described above, and is a technique for shortening the program stop time associated with code adjustment.

Means to Solve the Problem

A code adjustment device according to a first aspect of a technique disclosed in the present specification of the present application includes a loading unit configured to load an object file that is relocatable, a code adjustment planning unit configured to create a code adjustment plan list using a plurality of elements, each of which is a pair of a position where a code adjustment is to be performed and a corresponding adjustment content in the object file loaded by the loading unit and the already loaded object file, and, a code adjustment execution unit configured to execute a plurality of code adjustments based on the code adjustment plan list after the code adjustment plan list is created, wherein the code adjustment planning unit includes a means configured to check whether or not a value changes at a position where the code adjustment is performed before and after the code adjustment and, creates the code adjustment plan list, and the code adjustment planning unit creates the code adjustment plan list by excluding new elements that is the elements newly added to positions where the code adjustment is performed before and after the code adjustment.

Effects of the Invention

According to at least the first aspect of the technique disclosed in the present specification of the present application, code adjustment is not executed while the code adjustment plan list is being created by the code adjustment planning unit; therefore, it is not necessary to stop the program being an adjustment target. Therefore, the stop time of the program can be shortened.

The objects, characteristics, aspects, and advantages of the technique disclosed in the present specification of the present application will become more apparent from the following detailed description and the accompanying drawings.

BRIEF DESCRIPTION OF DRAWINGS

FIG. 2 A diagram illustrating an example of a program being an update target assumed in a present use case.

DESCRIPTION OF EMBODIMENT(S)

Figure 1:
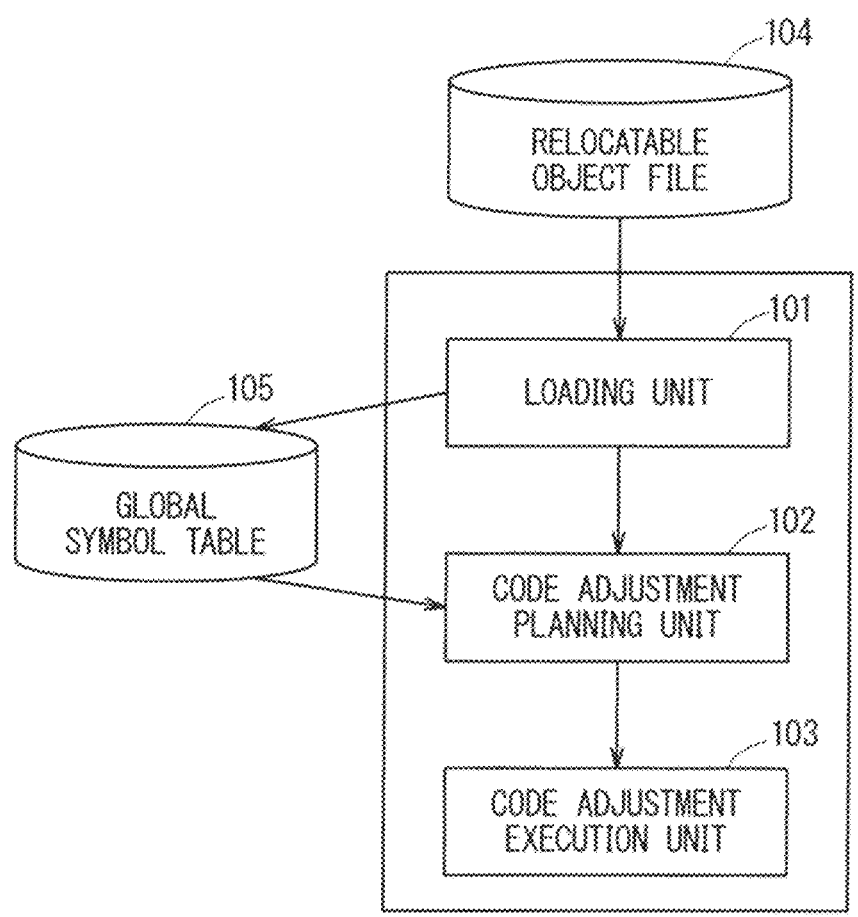
FIG. 1 A diagram conceptually illustrating an example of a code adjustment device according to Embodiment.

Hereinafter, Embodiments will be described with reference to the attached drawings. In the following Embodiments, although detailed features and the like are also illustrated for technical explanation, they are mere examples, and not all the features to be described are essential for the feasibility of Embodiments.

It should be noted that the drawings are schematically illustrated and, therefore, the configurations are appropriately omitted or simplified in the drawings for facilitating the description. Also, the mutual relationship among sizes and positions in configurations and the like illustrated in different drawings are not necessarily accurately described, and may be changed as appropriate. In addition, in the drawings such as plan views that are not cross-sectional views, hatching may be given to facilitate understanding of the contents of Embodiments.

In addition, in the following description, the same components are denoted by the same reference numerals, and the names and functions thereof are also similar. Accordingly, detailed descriptions thereof may be omitted to avoid redundancy.

Also, in the description written in the specification of the present application, when it is described that a certain component is "equipped", "included", or "an object has a certain component", etc., such wording does not exclude the existence of another component unless otherwise specified.

Also, in the description written in the specification of the present application, even though ordinal numbers such as "first" and "second" may be used, these terms are used for convenience for promoting the understanding of the contents of Embodiments and contents of Embodiments are not defined by the order caused by such ordinal numbers.

<Conceptual Configuration of Code Adjustment Device>

Figure 13:
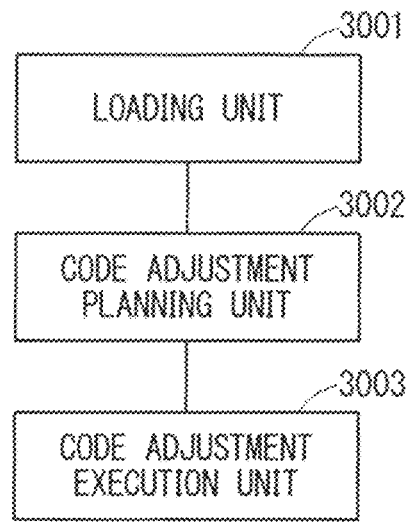
FIG. 13 A diagram conceptually illustrating an example of the code adjustment device according to Embodiment.

FIG. 13 is a diagram conceptually illustrating an example of the code adjustment device (functional units) according to Embodiment.

As illustrated in FIG. 13, the code adjustment device includes a loading unit 3001, a code adjustment planning unit 3002, and a code adjustment execution unit 3003.

The loading unit 3001 loads a relocatable object file. The code adjustment planning unit 3002 creates a code adjustment plan list using a plurality of elements, each of which is a pair of a position where a code adjustment is to be performed and a corresponding adjustment content in the object file loaded by the loading unit 3001. After the code adjustment plan list is created, the code adjustment execution unit 3003 executes a plurality of code adjustments based on the code adjustment plan list.

Each configuration illustrated in the drawings and the like in the following Embodiments more specifically illustrates an example of the configuration illustrated in FIG. 13 above.

Embodiment 1

A code adjustment device and a code adjustment method according to Embodiment 1 will be described below.

<Configuration of Code Adjustment Device>

FIG. 1 is a diagram conceptually illustrating an example of a code adjustment device according to Embodiment 1. The code adjustment device includes a loading unit 101, a code adjustment planning unit 102, and a code adjustment execution unit 103.

The code adjustment device has a functionality to load the relocatable object file 104 into a memory with the relocatable object file 104 as input, and perform linking so that a central processing unit (CPU) (not illustrated) can execute the object file correctly.

The loading unit 101 fetches the relocatable object file 104 from the network, the file system, or the like and expands the code contained in the relocatable object file 104 as it is on the memory. In the present specification, a code represents both instructions and data that constitute the program.

In terms of each symbol defined by the code expanded on the memory by the loading unit 101, X represents the symbol name and Y represents the load destination address, the loading unit 101 registers a pair of the symbol name X and the load destination address Y in a global symbol table (global symbol table 105).

The global symbol table 105 is a data structure that contains pairs of symbol names defined in loaded object files and their load destination addresses as a table. The global symbol table 105 is assumed to be stored in a main storage device or an external storage device.

If a symbol name X already has an entry in the global symbol table 105 (that is, if it is registered), the loading unit 101 updates the entry with the new load destination address Y. That is, the global symbol table 105 is updated every time an object file is loaded, Note that the symbol here indicates a function, a variable, or the like.

The code adjustment planning unit 102 scans the entries in the relocation table of the object files loaded by the loading unit 101, and determines a value to be rewritten for each location where a code needs to be rewritten. However, the code adjustment planning unit 102 does not immediately rewrite the code. Instead, the code adjustment planning unit 102 adds a pair of the address of the part where the code needs to be rewritten and the value to be rewritten to the code adjustment plan list. Note that the code adjustment planning unit 102 only determines the address of the part where the code needs to be rewritten and the value to be rewritten, and does not actually rewrite the code.

The code adjustment execution unit 103 scans the code adjustment plan list created and updated by the code adjustment planning unit 102, and executes code adjustment of the part where code rewriting is required. That is, the code adjustment execution unit 103 actually rewrites the code of the program.

A relocatable object file 104 is an object file generated by a general compiler. Although in this embodiment, an ELF linkable file (ELF file) is assumed, other object file formats may be adoptable.

An ELF file consists of a plurality of sections. In each section, there exist code sections, symbol tables, relocation tables, end the like, depending on their respective roles.

In the code section, there exist a .text section containing an instruction sequence and a data section containing data separately. The difference between the two lies in the permissions for reading, writing, and executing, or in the difference in memory areas for loading. However, there is no essential difference between the two as link targets.

The symbol table contains a list of symbols (variable name or function name) that the code uses or defines. Also, when a symbol is defined by a code in the relocatable object file 104, the symbol table entry corresponding to the symbol contains the definition position in the relocatable object file 104. It should be noted that similar terms such as global symbol table 105 and symbol table are used in the present specification. When described simply as the symbol table, it refers to the symbol table in the relocatable object file 104.

The relocation table is a table that contains information on symbol reference part in the code. An entry for each symbol reference part exists in the code.

Hereinafter, before describing the details, an example is given as a use case of Embodiment 1 in which a plurality of relocatable object files 104 constituting a program are loaded, and a partial update of the program is performed by replacing some of the relocatable object files 104.

Figure 2:
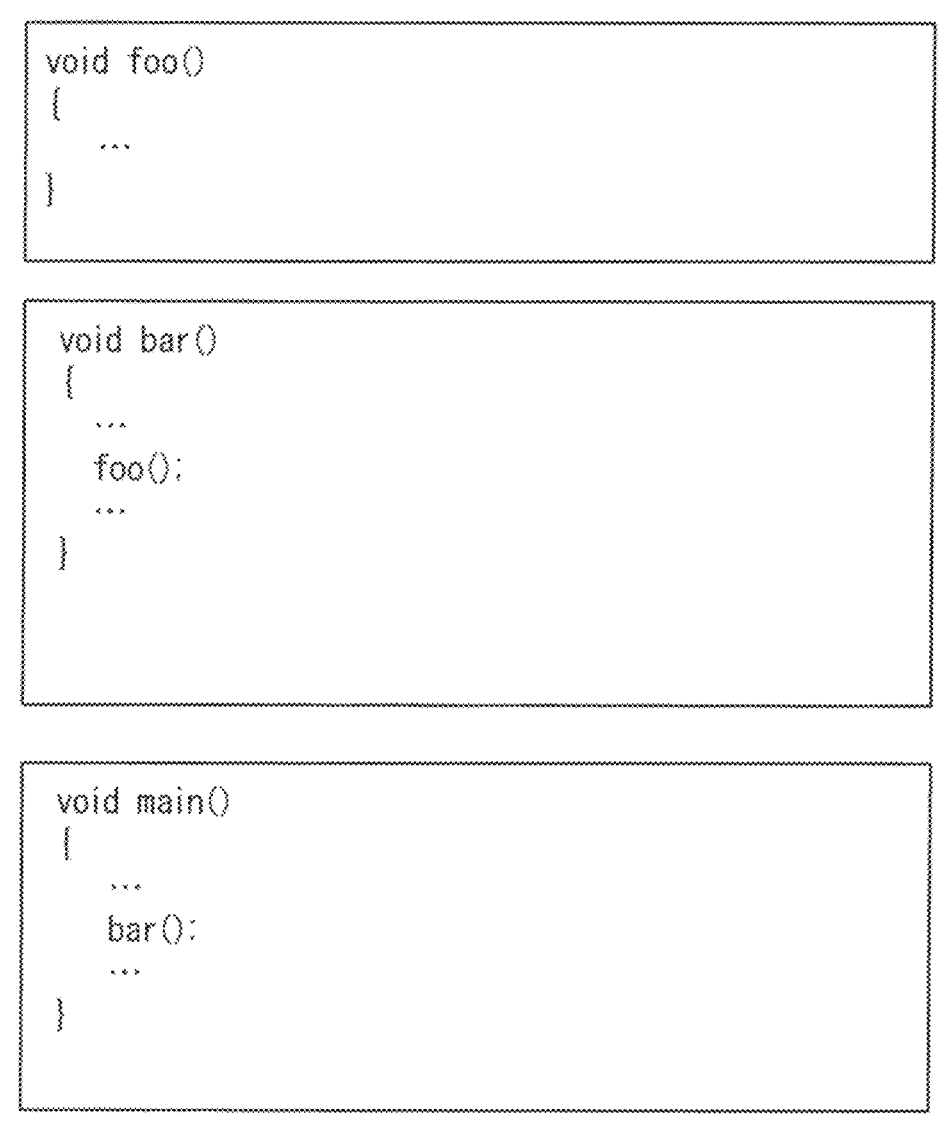

FIG. 2 is a diagram illustrating an example of a program (C language program) being an update target assumed in the present use case. In the present use case, the program that is the update target is assumed to consist of three functions: foo, bar, and main. As illustrated in FIG. 2, the function main calls to the function bar, and the function bar calls to the function foo. And, it is also assumed that each of these functions is stored in different source files: foo.c, bar.c, and main.c.

Compiling the above program with a regular compiler such as gcc will produce ELF relocatable object files foo.o, bar.o and main.o.

To execute the program, foo.o, bar.o and main.o are input in order to the code adjustment device illustrated in FIG. 1 and the linking process is performed. Also, when reflecting the content of the source file bar.c recreated by rewriting the program anew, bar.o, which is a relocatable object file obtained by compiling bar.c, may be input again to the code adjustment device illustrated in FIG. 1 and the linking process is performed. Such operations will be described with reference to FIGS. 3, 4, 5 and 6.

Figure 3:
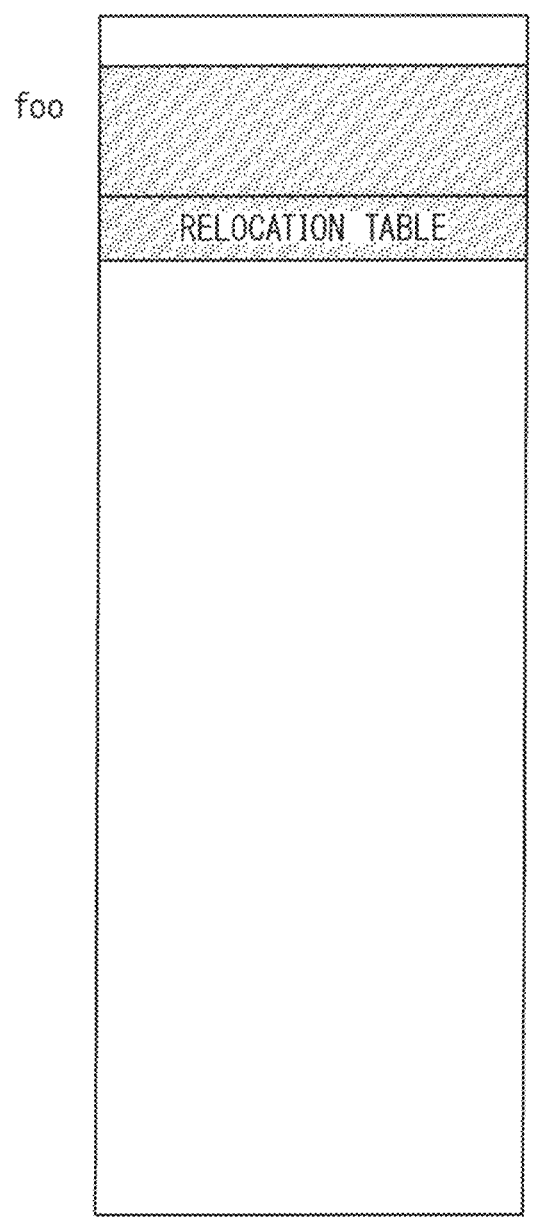
FIG. 3 A diagram illustrating a state of the memory immediately after a linking process has been performed with foo.o as input.

First, the linking process is performed with foo.o as input. FIG. 3 is a diagram illustrating a state of the memory immediately after the linking process has been performed with foo.o as input. In this case, in the code adjustment device illustrated in FIG. 1, the loading unit 101 expands the code and the relocation table included in the relocatable object file foo.o on the memory. The loading unit 101 also reflects the address of the symbol determined as a result of expanding foo.o in the global symbol table 105.

Figure 4:
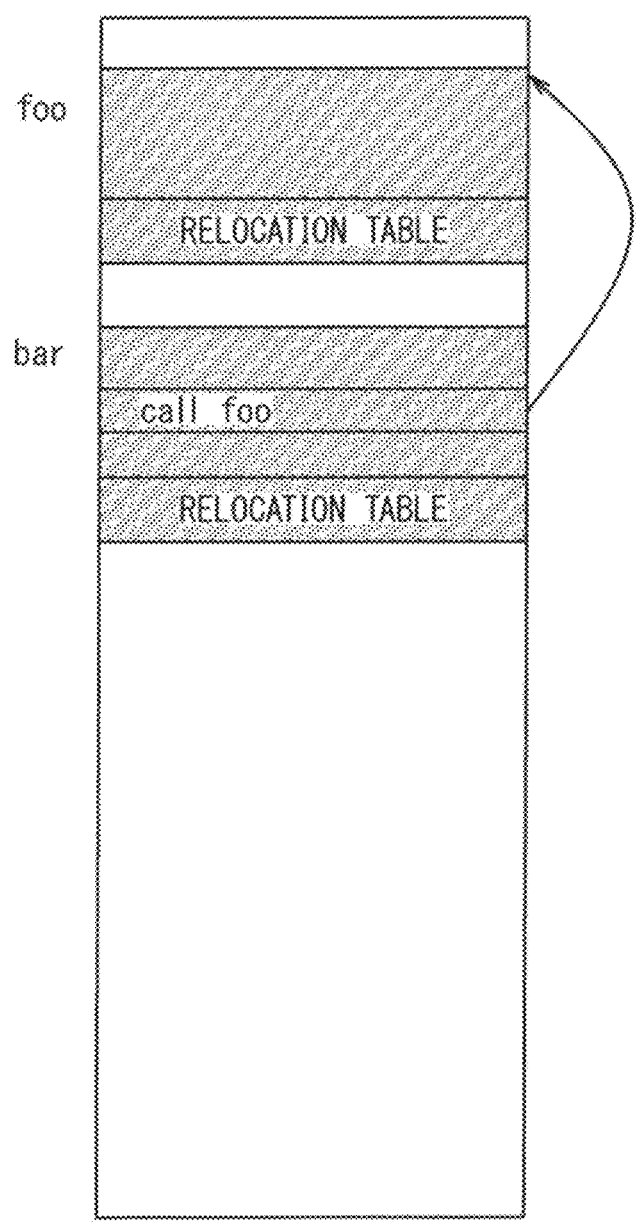
FIG. 4 A diagram illustrating a state of the memory immediately after the linking process has been performed with bar.o as input.

Next, the second round of the linking process is performed with bar.o as input. FIG. 4 is a diagram illustrating a state of the memory immediately after the linking process has been performed with bar.o as input. In FIG. 4, the loading unit 101 expands the code and the relocation table included in the relocatable object file bar.o on the memory. Also, the code of the function bar includes a call to the function foo, and a call to the function foo has been rewritten with the address of the function foo so that the function foo is called properly.

Figure 5:
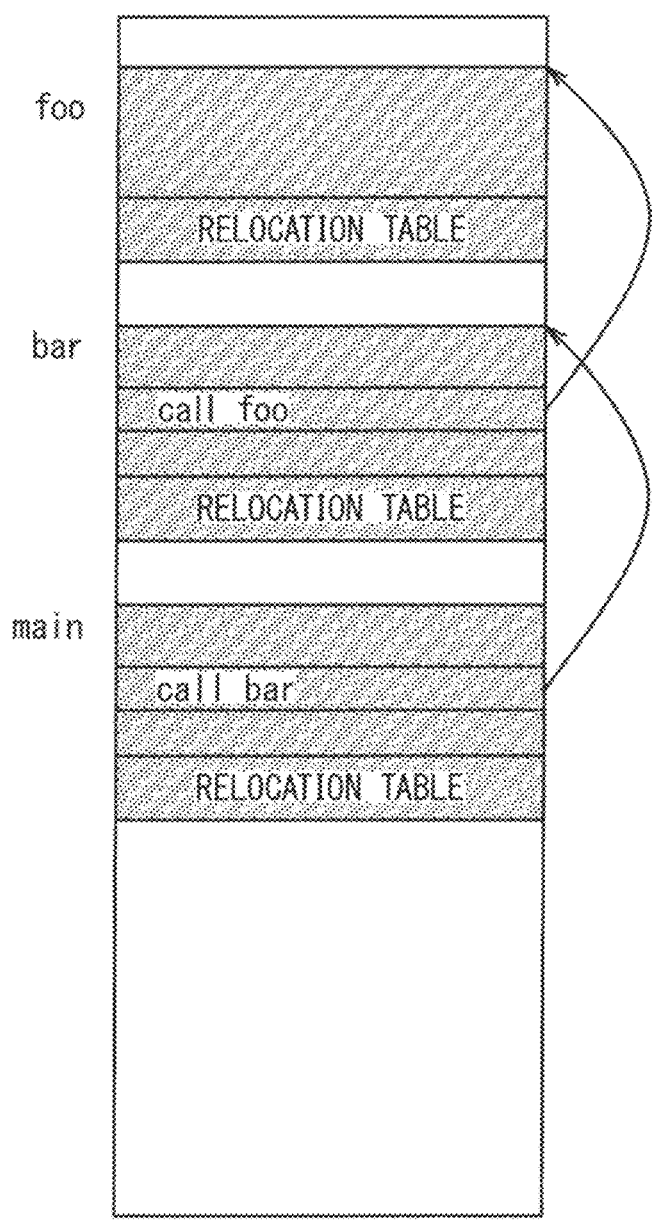
FIG. 5 A diagram illustrating a state of the memory immediately after the linking process has been performed with main.o as input.

Next, the third round of the linking process is performed with main.o as input. FIG. 5 is a diagram illustrating a state of the memory immediately after the linking process has been performed with main.o as input. In FIG. 5, the code and the relocation table included in the relocatable object file main.o are expanded on the memory in the state illustrated in FIG. 4. Also, the call to the function bar in the code of the function main is updated with the address of the function bar.

Preparations for executing the main function are completed after the three rounds of the linking process that have been performed so far. When the CPU executes the function main, the function bar is executed and then the function foo is executed.

Next, consider the case of partially updating the program by replacing the function bar. First, create a new source file, bar.c, and compile it with a compiler to generate a new relocatable object file, bar.o, corresponding to the new function bar.

Figure 6:
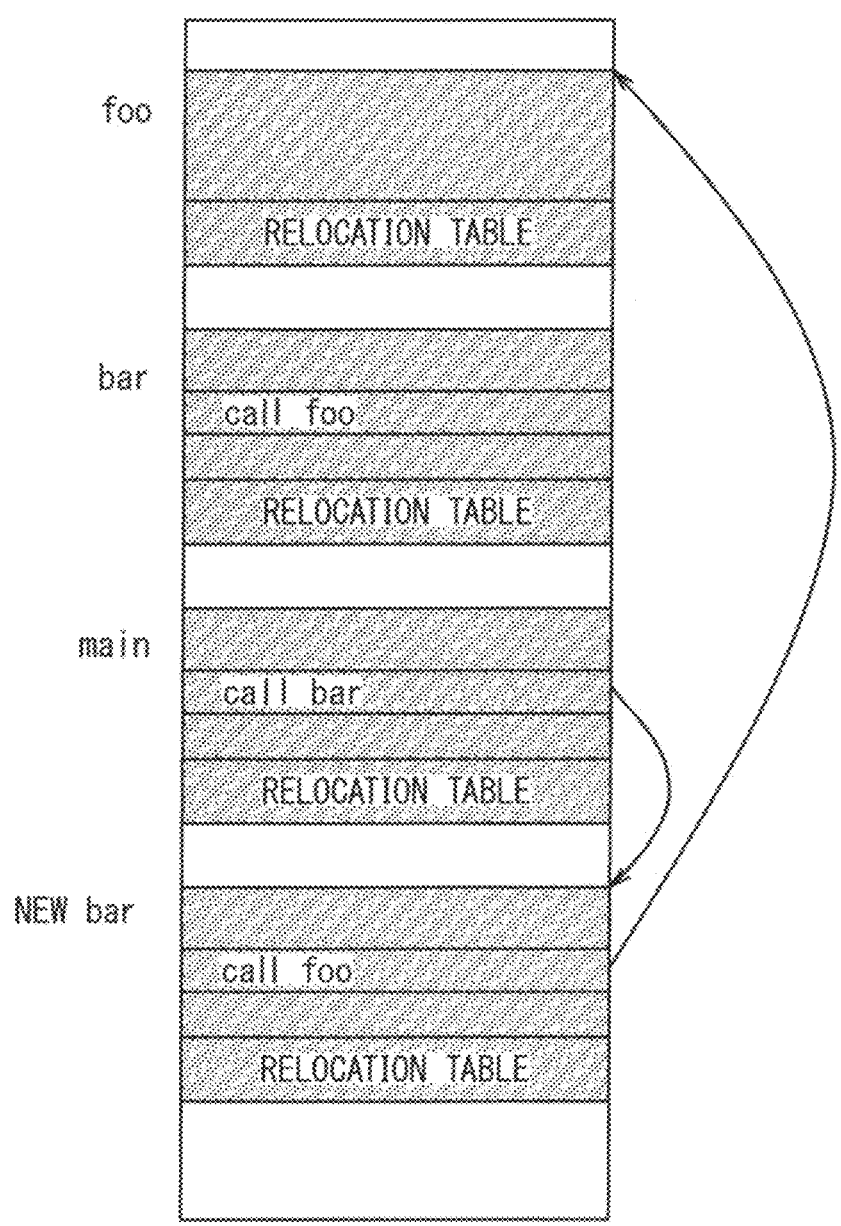
FIG. 6 A diagram illustrating a state of the memory after the linking process has been performed with new bar.o as input.

Then, by performing the linking process with the new bar.o as input, the new function bar becomes effective. FIG. 6 is a diagram illustrating a state of the memory after the linking process has been performed with the new bar.o as input. The loading unit 101 in the code adjustment device updates the entry of the function bar in the global symbol table 105 with the address of the new function bar. Next, the code adjustment planning unit 102 in the code adjustment device determines values to be rewritten for the call to the function foo in the newly loaded new function bar and the call to the function bar in the already loaded function main. Furthermore, the code adjustment execution unit 103 in the code adjustment device performs code adjustment on these calls. At this point, the value to be rewritten at the call to the function foo is the address of the function foo already registered in the global symbol table 105 in the previous linking process. Also, the value to be rewritten at the call to the function bar is the address of the function bar already registered in the global symbol table 105 in the previous linking process.

Hereinafter, the loading unit 101, the code adjustment planning unit 102, and the code adjustment execution unit 103 that can implement the above use case will be described below.

The loading unit 101 performs a common process of loading code sections of an ELF file on the memory. The loading unit 101 loads an object file F into a free area on the memory. Here, assume that the entire ELF file is placed in the memory.

A symbol table of the object file F contains the offset O for each symbol name X defined in the object file F. The offset O is the byte offset from the beginning of the section where the symbol with symbol name X is defined. Also, a section header table of the object file F contains the position of the section as an offset P from the head of the file.

Therefore, if an ELF file is loaded at an address A, the load destination address Y of the symbol name X is calculated as the sum of the address A, the offset O from the head of the section, and the offset P from the file head of the section, that is, A+O+P.

The loading unit 101 (arranging means) scans the symbol table, calculates the load destination address Y for each symbol defined in the object file, and registers the pair of the symbol name X and the load destination address Y in the global symbol table 105.

The loaded program may refer to the addresses of external functions, variables, etc. defined in the object file. In that case, it is necessary to rewrite the part that refers to the address of the function or the variable to the adjust address and store thereof.

A list of parts referring to the address of functions or variables, etc. is stored in the relocation table of the object file. Also, the locations of variables and functions included in the loaded object file are stored in the global symbol table 105 stores. Therefore, by using the global symbol table 105 and the relocation table of the object file, the adjust address can be substituted at the part that refers to the address of the function or variable defined outside the object file. In Embodiment 1, the code adjustment planning unit 102 and the code adjustment execution unit 103 rewrite functions or variables necessary for program execution, that is, rewriting of symbol reference parts.

<Operation of Code Adjustment Device>

Figure 7:
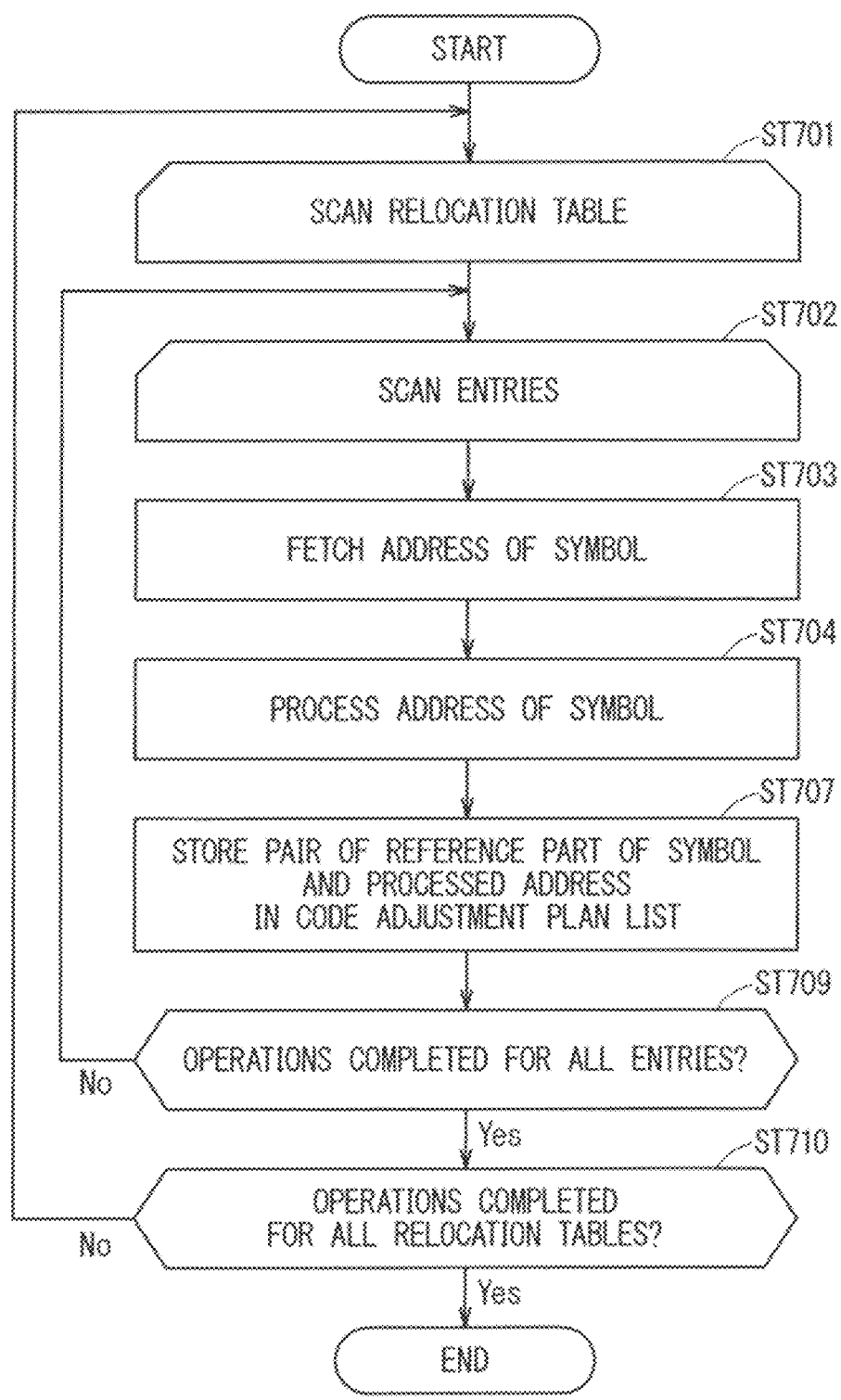
FIG. 7 A flowchart illustrating an example of an operation of a code adjustment planning unit according to Embodiment FIG. 8 A flowchart illustrating an example of an operation of a code adjustment execution unit according to Embodiment.

FIG. 7 is a flowchart illustrating an example of an operation of the code adjustment planning unit 102 according to Embodiment 1. The code adjustment planning unit 102 performs a loop process of Steps ST701, ST702, ST703, ST704, ST707, ST709, and ST710. The number of repetitions of the loop process matches the number of loaded object files. For example, when only foo.o is loaded as illustrated in FIG. 3, only the relocation table of foo.o is processed. Meanwhile, when three items of foo.o, bar.o, and main.o are to be loaded, as illustrated in FIG. 5, the loop process will be repeated three times, the relocation tables of foo.o, bar.o, and main.o. are processed in each loop process.

In Step ST701, the code adjustment planning unit 102 scans through one or more relocation tables (for example, a relocation table T) expanded on the memory. Then, in Step ST702, the code adjustment planning unit 102 scans entries E included in the relocation table T.

The relocation table T corresponding to the object file has an entry E for each reference part to a variable or a function not defined in the object file in the code of the object file. And, the relocation table T contains which symbol is referenced for each reference part.

At entry E the relocation table T in the object file, the symbol is contained in an offset in the symbol table within the object file. In Steps ST703, ST704 and ST707 illustrated in FIG. 7, the code adjustment planning unit 102 creates a code adjustment plan using the entry E of the relocation table T and global symbol table 105 created or updated by the loading unit 101.

In Step ST703, the code adjustment planning unit 102 searches global symbol table 105 for a symbol S indicated by the entry E, and fetches the address A of the symbol S.

Next, in Step ST704, the code adjustment planning unit 102 processes the address A of the symbol S based on a relocation type of the entry E. The relocation type is a value that indicates how an address is stored at a symbol reference part. Typically, a relocation type and a corresponding processing method therefor are determined for each instruction set architecture. Examples of relocation types include relocation types for program counter-relative address reference parts. If the symbol reference part is a CALL instruction relative to the program counter, the address of the CALL destination function is stored in the instruction field as the difference from the address of the CALL instruction. Typically, in the Abstract Binary Interface (ABI) for each instruction set architecture, one dedicated relocation type is assigned to indicate the adjustment of a program counter relative reference part.

Next, in Step ST707, the code adjustment planning unit 102 stores a pair of the reference part of the symbol S indicated by the entry E and a processed address B (that is, a value directly written as adjustment content) in the code adjustment plan list. The code adjustment plan list is input to the code adjustment execution unit 103, which will be described later.

In Step ST709, it is determined whether or not the above Steps ST703, ST704 and ST707 have been completed for all the entries E in the relocation table T. Then, if Steps ST703, ST704 and ST707 described above have been completed for all the entries E (that is, when corresponding to Yes in FIG. 7), the process proceeds to Step ST710. Meanwhile, if Steps ST703, ST704, and ST707 have not been completed for some of the entries E (that is, corresponding to No in FIG. 7), the process returns to Step ST702.

In Step ST710, it is determined whether or not the above Steps ST703, ST704, ST707 and ST709 have been completed for all the relocation tables expanded on the memory. Then, when the above Steps ST703, ST704, ST707 and ST709 have been completed for all the entries E (that is, when corresponding to Yes in FIG. 7), the operation is ended. Meanwhile, if Steps ST703, ST704, ST707, and ST709 have not been completed for some of the relocation tables (that is, corresponding to No in FIG. 7), the process returns to Step ST701.

In the example illustrated in FIG. 7, storing of all the entries E into the code adjustment plan list is implemented, but the storing may be implemented on some of the entries E.

Figure 8:
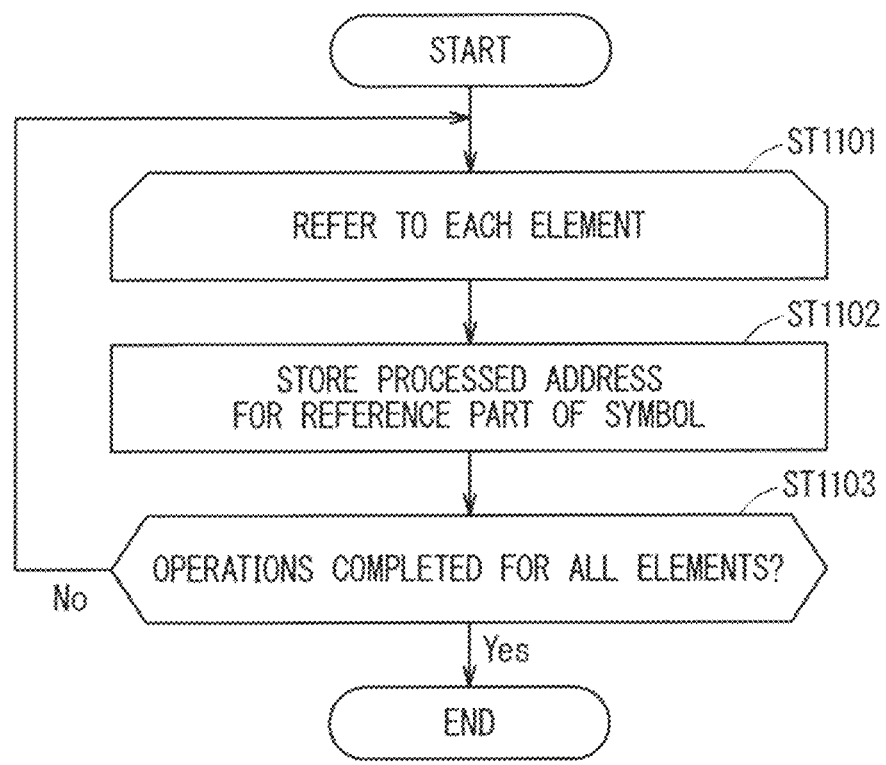

FIG. 8 is a flowchart illustrating an example of an operation of the code adjustment execution unit 103 according to Embodiment 1. What is input to the code adjustment execution unit 103 is the code adjustment plan list created by the code adjustment planning unit 102. After the code adjustment plan list is created by the code adjustment planning unit 102, the code adjustment execution unit 103 performs the loop process of Steps ST1101, ST1102 and ST1103 for each element i of the code adjustment plan list. Each element i is a pair of the reference part of the symbol S and the processed address B.

In Step ST1101, the code adjustment execution unit 103 refers to each element i in the code adjustment plan list.

Next, in Step ST1102, the code adjustment execution unit 103 stores the processed address B for the reference part of the symbol S.

In Step ST1103, it is determined whether or not Step ST1102 has been completed for all the elements i. Then, if the above Step ST1102 has been completed for all the elements i (that is, when corresponding to Yes in FIG. 8), the operation is ended. Meanwhile, if the above Step ST1102 has not been completed for some of the elements i (that is, when corresponding to No in FIG. 8), the process returns to Step ST1101.

Figure 9:
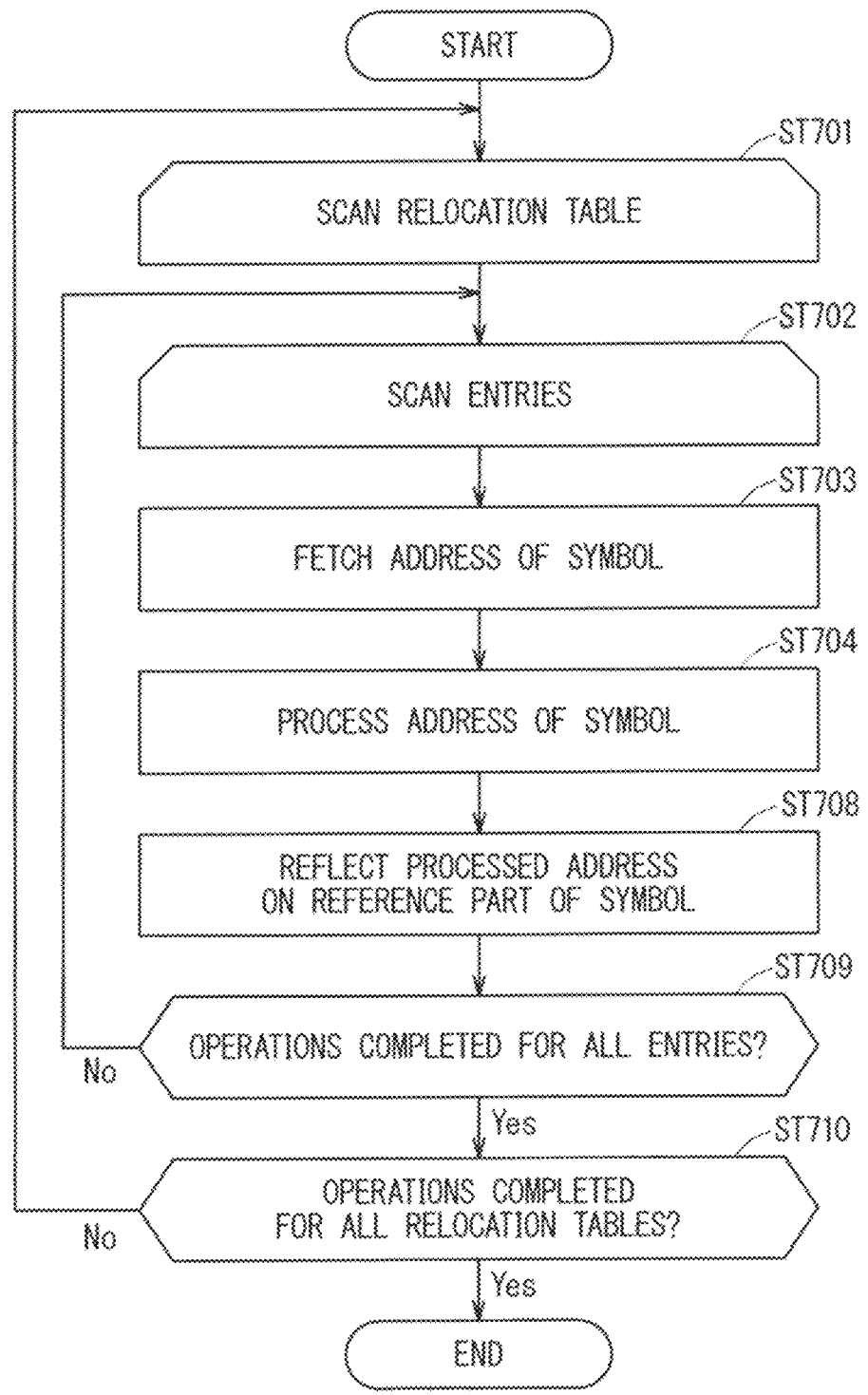
FIG. 9 A flowchart illustrating an example of a conventional code adjustment process.

Here, the conventional code adjustment process will be described. FIG. 9 is a flowchart illustrating an example of a conventional code adjustment process. The difference between the code adjustment process illustrated in FIG. 9 and the operation illustrated in FIG. 7 is that Step ST707 in FIG. 7 is replaced with. Step ST708 in FIG. 9.

In Step ST707 of FIG. 7, the code adjustment planning unit 102 stores the pair of the reference part of the symbol S and the processed address B in the code adjustment plan list, whereas in Step ST708 of FIG. 9, the processed address B is reflected on the reference part of the symbol S.

In the above case, during the loop process of Steps ST701, ST702, ST703, ST704, ST708, ST709 and ST710, code rewriting is repeatedly performed in Step ST708; therefore, the program to be updated cannot be executed while the loop process is being performed. The loop process includes Step ST703 with string process, and the program to be updated should be stopped while performing the process as well.

Meanwhile, in the operation illustrated in FIG. 7, the code adjustment planning unit 102 does not rewrite the program to be updated at all. Therefore, even if the program to be updated is being executed, the operation in the code adjustment planning unit 102 can be executed in parallel. When performing the operations illustrated in FIGS. 7 and 8, it is necessary to stop the program to be updated only during the operation of the code adjustment execution unit 103 illustrated in FIG. 8.

The process illustrated in FIG. 8 is a loop process that includes only Step ST1102, which is an operation with substantially the same amount of calculation as Step ST708 of the code adjustment process illustrated in FIG. 9. Also, the number of repetitions of the loop process performed by the code adjustment execution unit 103 is the same as the number of repetitions of the loop process of Steps ST701, ST702, ST703, ST704, ST708, ST709 and ST710 illustrated in FIG. 9. In the process illustrated in FIG. 8, Steps other than Step ST708 illustrated in FIG. 9 are not included in the loop process; therefore, the time until the loop process ends is shortened.

Therefore, by using the process illustrated in FIG. 8, it is possible to shorten the time required to stop the program to be updated compared with the conventional method.

Embodiment 2

A code adjustment device and a code adjustment method according to Embodiment 2 will be described below. In the following description, components similar to those described in Embodiment described above are denoted by the same reference numerals, and detailed description thereof will be omitted as appropriate.

<Configuration of Code Adjustment Device>

When creating the code adjustment plan list, even a portion that does not require code adjustment is output to the code adjustment plan list in some cases.

Here, the linking process illustrated in FIG. 5 is considered as an example. In the third round of the linking process illustrated in FIG. 5, the relocation tables for each of the loaded function foo, the function bar and the function main, are processed through the loop process of Steps ST701, ST702, ST703, ST704, ST707, ST709 and ST710 illustrated in FIG. 7.

In this case, in Step ST707, the call to the function foo in the function bar and the address of function foo are output to the code adjustment plan list. Then, as illustrated in FIG. 8, the code adjustment execution unit 103 actually rewrites the call to the function foo in the function bar.

However, the above rewriting is essentially unnecessary. As illustrated in FIG. 4, in the second round of the linking process, the call to the function foo in the function bar has already been adjusted, and the above rewriting is unnecessary.

Figure 10:
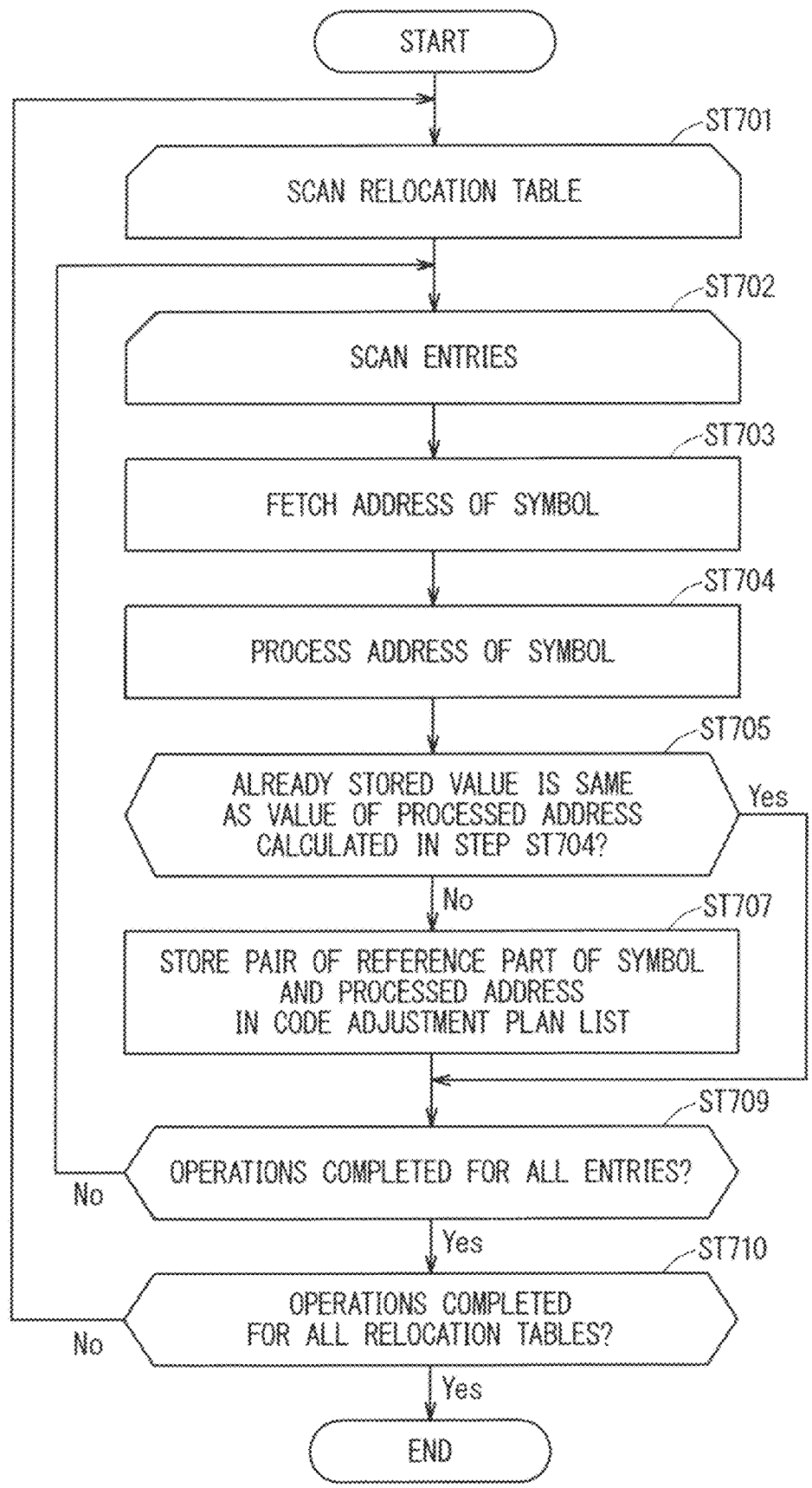
FIG. 10 A flowchart illustrating an example of an operation of a code adjustment planning unit according to Embodiment.

FIG. 10 is a flowchart illustrating an example of an operation of the code adjustment planning unit 102 according to Embodiment 2. In FIG. 10, unnecessary code adjustment as described above is suppressed.

Specifically, unlike the case illustrated in FIG. 7, Step ST705 is added after Step ST704.

In Step ST705, the code adjustment planning unit 102 checks the value stored in the reference part of the symbol S indicated by the entry E of the relocation table T. Then, the code adjustment planning unit 102 determines whether or not the already stored value is the same as the value of the processed address B calculated in Step ST704.

Then, if the already stored value is the same as the value of the processed address B calculated in Step ST704 (that is, when corresponding to Yes in FIG. 10), skip Step ST707 and the process proceeds to Step ST709. Meanwhile, if the already stored value is different from the value of the processed address B calculated in Step ST704 (that is, when corresponding to No in FIG. 10), the process proceeds to Step ST707.

According to the above operation, information (elements) regarding code adjustment that does not need to be changed is not output to the code adjustment plan list. Therefore, even in the code adjustment execution unit 103 that performs adjustment using the code adjustment plan list, unnecessary code adjustment is suppressed.

According to Embodiment 2, with Step ST705 provided, the operations of the code adjustment planning unit 102 and the code adjustment execution unit 103 relating to unnecessary code adjustment are suppressed; therefore, the entire code adjustment operation can be accelerated.

Embodiment 3

A code adjustment device and a code adjustment method according to Embodiment 3 will be described below. In the following description, components similar to those described in Embodiments described above are denoted by the same reference numerals, and detailed description thereof will be omitted as appropriate.

<Configuration of Code Adjustment Device>

Code adjustment includes code adjustment that does not basically require the program to be stopped, and if such code adjustment is performed while the program is stopped, the program stop time may be made longer.

Here, the linking process illustrated in FIG. 6 is considered as an example. The old function bar in the third round of the linking process illustrated in FIG. 5 should be valid until the call to the function bar in the function main is rewritten to the address of the new function bar in the fourth round of the linking process illustrated in FIG. 6. Therefore, even if the program is being executed, it is possible to safely rewrite the reference part of the external symbol of the new function bar (that is, the call to the function foo).

However, in the operation illustrated in FIG. 7, the relocation table of the new function bar is to be also processed, and the call to the function foo and the address of the function foo are output to the code adjustment plan list. Then, based on the code adjustment plan list, the code adjustment execution unit 103 performs adjustment including the code of the new function bar. That is, the code adjustment execution unit 103 also performs code adjustment of the new function bar.

The code of the new function bar can be rewritten even if the code adjustment planning unit 102 is in operation. This is because the code for the new function bar does not take effect until other already loaded code is adjusted to pass through the new function bar.

Figure 11:
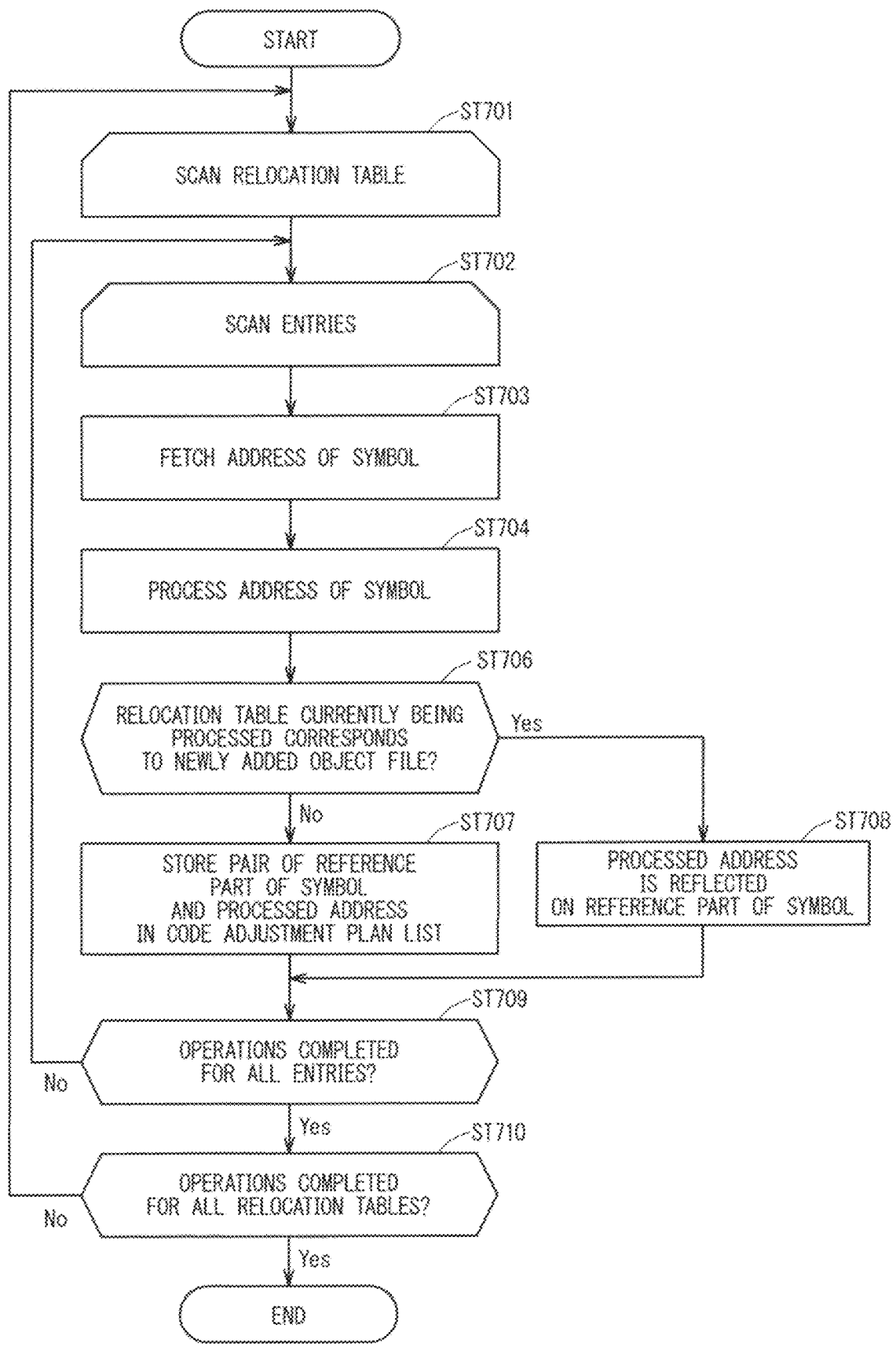
FIG. 11 A flowchart illustrating an example of an operation of a code adjustment planning unit according to Embodiment.

FIG. 11 is a flowchart illustrating an example of an operation of the code adjustment planning unit 102 according to Embodiment 3. Specifically, unlike the case illustrated in FIG. 7, in FIG. 11, Step ST706 is added after Step ST704.

In Step ST706, the code adjustment planning unit 102 determines whether or not the relocation table T currently being processed corresponds to the newly added object file.

Then, when it corresponds to the newly added object file (that is, when corresponding to Yes in FIG. 11), the process proceeds to Step ST708. Then, when it does not correspond to the newly added object file (that is, when corresponding to No in FIG. 11), the process proceeds to Step ST707.

In Step ST708, the processed address B is reflected on the reference part of the symbol S. Meanwhile, in Step ST707, the code adjustment planning unit 102 stores a pair of the reference part of the symbol S indicated by the entry E and the processed address B in the code adjustment plan list.

According to Embodiment 3, elements (new elements) resulting from newly added object files are not added to the code adjustment plan list. Further, with Step ST706 provided, the processing amount of the code adjustment execution unit 103 can be reduced by executing only the code adjustment of the part that does not affect the operation of the program in operation (that is, the code adjustment of the newly loaded code) before the creation of the code adjustment plan list is completed. As a result, the stop time of the program during the linking process can be shortened.

Embodiment 4

A code adjustment device and a code adjustment method according to Embodiment 4 will be described below. In the following description, components similar to those described in Embodiments described above are denoted by the same reference numerals, and detailed description thereof will be omitted as appropriate.

<Configuration of Code Adjustment Device>

In the above Embodiments, when the object file is loaded, the relocation table and the accompanying symbol table are also stored in the memory. Also, the global symbol table 105 created by the loading unit 101 is necessary for the operation of the code adjustment planning unit 102, but is unnecessary for executing the updated program itself.

In the above case, unnecessary data for program execution is to be stored in the memory, and this may not be applicable for systems with small memory capacity.

Figure 12:
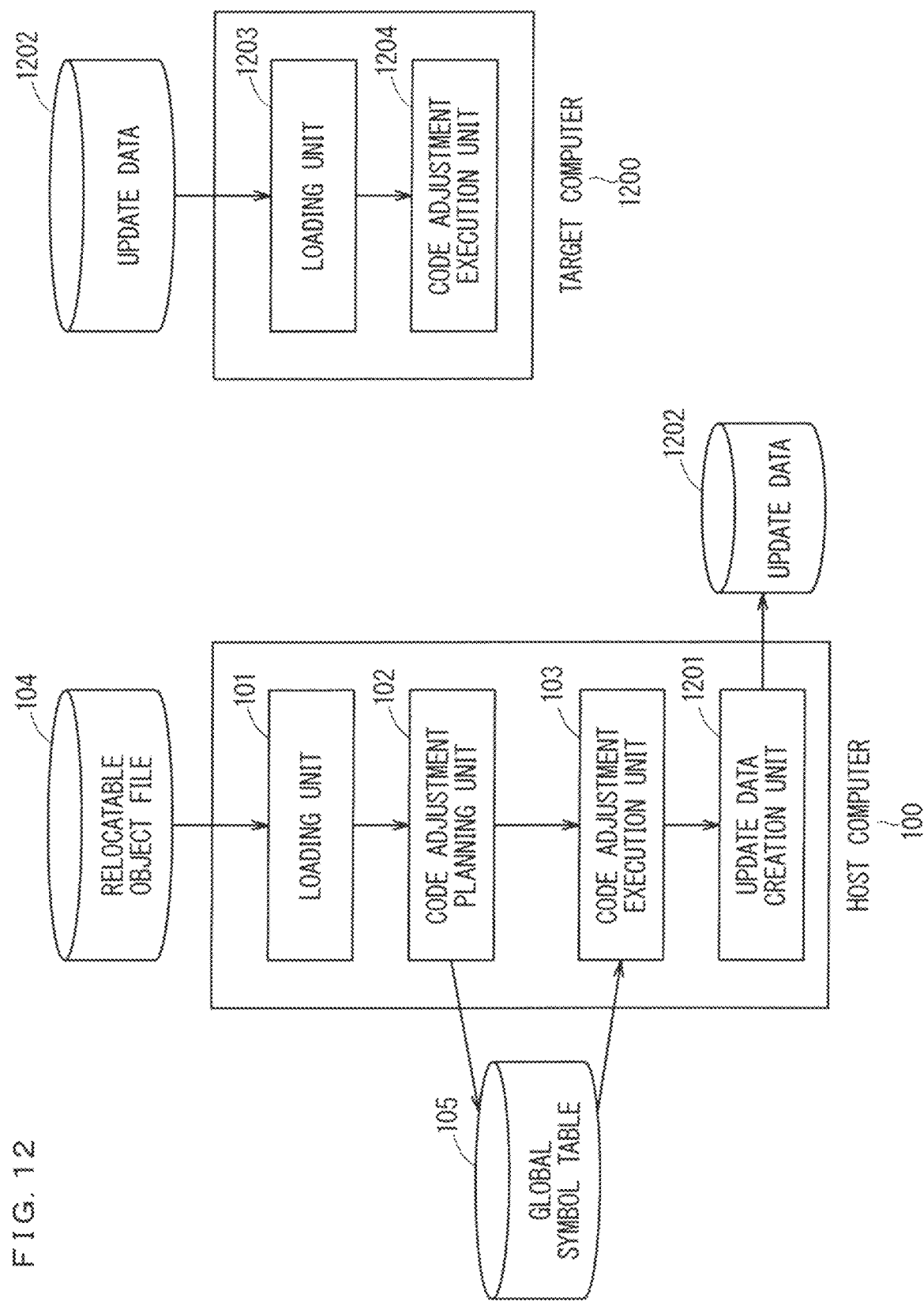
FIG. 12 A diagram conceptually illustrating an example of a code adjustment device according to Embodiment.

FIG. 12 is a diagram conceptually illustrating an example of the code adjustment device according to Embodiment 4. The code adjustment device includes a host computer 100 and a target computer 1200.

The host computer 100 includes a loading unit 101, a code adjustment planning unit 102, a code adjustment execution unit 103, and an update data creation unit 1201.

The target computer 1200 includes a loading unit 1203 and a code adjustment execution unit 1204.

The update data creation unit 1201 puts together the code byte string and the load destination address included in a relocatable object file 104 loaded by the loading unit 101 and the code adjustment plan list created by the code adjustment planning unit 102, and updates this as update data 1202, or transmits this to the target computer 1200.

The loading unit 1203 in the target computer 1200 reads the recorded update data 1202 or receives the update data 1202 transmitted from the host computer 100, thereby fetching the code byte string stored in the update data 1202, the load destination address, and the code adjustment plan list. Then, the byte string is expanded to the load destination address on the memory.

As with the code adjustment execution unit 103, the code adjustment execution unit 1204 in the target computer 1200 scans the code adjustment plan list and executes code adjustment where code rewriting is required.

By providing the code adjustment planning unit 102 and the code adjustment execution unit 103 in the host computer 100 for development as in the above configuration, the program can be compiled by a host computer 100 different from the target computer 1200 for executing the program.

In Embodiment 4, the linking process illustrated in above Embodiment can be implemented by not only compiling the program in the host computer 100 but also on a virtual memory imitating the memory of the target computer 1200.

Also, by transmitting the code adjustment plan list created by the code adjustment planning unit 102 and the object file from the host computer 100 to the target computer 1200, and further, the target computer 1200 that received the data expanding the object file on the memory, enables to execute code adjustment based on the code adjustment plan list in the target computer 1200 while the host computer 100 is only creating the code adjustment plan list.

<Hardware Configuration of Code Adjustment Device>

Figure 14:
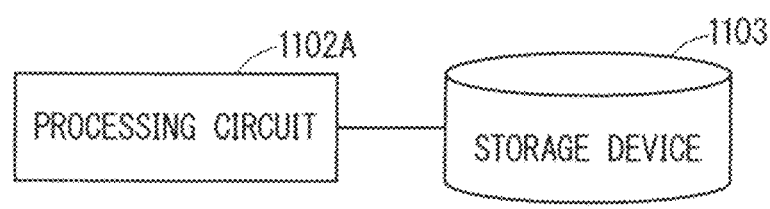
FIG. 14 A diagram schematically exemplifying a hardware configuration when actually operating the code adjustment device which is exemplified in FIG. 1.
Figure 15:
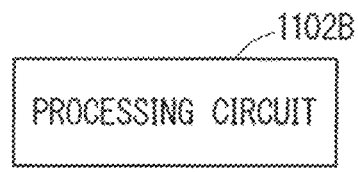
FIG. 15 A diagram schematically exemplifying a hardware configuration when actually operating the code adjustment device which is exemplified in FIG. 1.

FIGS. 14 and 15 are diagrams schematically exemplifying hardware configurations when actually operating the code adjustment device which is exemplified in FIG. 1.

It should be noted that the hardware configurations illustrated in FIGS. 14 and 15 may not match the configuration illustrated in FIG. 1 in terms of numbers of components or the like, this is because the configuration illustrated in FIG. 1 illustrates conceptual units.

Thus, it may be assumed a case where at least if one configuration illustrated in FIG. 1 composed of a plurality of hardware configurations illustrated in FIGS. 14 and 15, a case where one configuration illustrated in FIG. 1 corresponds to part of the hardware configuration illustrated in FIGS. 14 and 15, and further, a case where a plurality of configurations illustrated in FIG. 1 are provided in one hardware configuration illustrated in FIGS. 14 and 15.

In FIG. 14, a processing circuit 1102A that performs the calculation and a storage device 1103 that stores information are illustrated as the hardware configuration for implementing the loading unit 101, the code adjustment planning unit 102, and the code adjustment execution unit 103 in FIG. 1. The configuration also applies to the other Embodiments.

In FIG. 15, a processing circuit 1102B that performs the calculation is illustrated as the hardware configuration for implementing the loading unit 101, the code adjustment planning unit 102, and the code adjustment execution unit 103 in FIG. 1. The configuration also applies to the other Embodiments.

The global symbol table 105 is implemented by the storage device 1103 or another storage device (not illustrated here).

The storage device 1103 may be, for example, a volatile or non-volatile semiconductor memory, such as a hard disk drive (HDD), a random access memory (RAM), a read only memory (ROM), a flash memory, an erasable programmable read only memory (EPROM), an electrically erasable programmable read-only memory, (EEPROM), or the like, or a memory (storage medium) including a magnetic disk, a flexible disk, an optical disk, a compact disk, a digital versatile disc (DVD) and a drive therefor or the like, or any storage medium used in the future.

The processing circuit 1102A may execute a program stored in the storage device 1103, an external CD-ROM, an external DVD-ROM, or an external flash memory. That is, for example, a central processing unit (CPU), a microprocessor, a microcomputer, a digital signal processor (DSP) may also be adoptable therefor.

When the adopted processing circuit 1102A executes a program stored in the storage device 1103, an external CD-ROM, an external DVD-ROM, or an external flash memory, the loading unit 101, the code adjustment planning unit 102, and the code adjustment execution unit 103 are implemented by software, firmware, or a combination of software and firmware in which a program stored in the storage device 1103 is executed by the processing circuit 1102A. Note that the functions of the loading unit 101, the code adjustment planning unit 102, and the code adjustment execution unit 103 may be implemented by, for example, cooperation of a plurality of processing circuits.

Software and firmware may be written as a program and stored in the storage device 1103. In that case, the processing circuit 1102A reads out and executes the program stored in the storage device 1103 to implement the above functions. That is, the storage device 1103 may store a program that, when executed by the processing circuit 1102A, is implemented the above functions ultimately.

Also, the processing circuit 1102B may be dedicated hardware. That is, for example, a single circuit, a composite circuit, a programmed processor, a parallel programmed processor, an application specific integrated circuit (i.e., ASIC), a field-programmable gate array (FPGA), or a combination thereof may also be adoptable.

When the processing circuit 1102B is dedicated hardware, the loading unit 101, the code adjustment planning unit 102, and the code adjustment execution unit 103 are implemented by the operation of the processing circuit 1102B. Note that the functions of the loading unit 101, the code adjustment planning unit 102, and the code adjustment execution unit 103 may be implemented by individual circuits or a single circuit.

The functions of the loading unit 101, the code adjustment planning unit 102, and the code adjustment execution unit 103 are partly implemented by the processing circuit 1102A that executes the program stored in the storage device 1103, and partly by the processing circuit 1102B being dedicated hardware.

Effect Produced by Embodiments Described Above

Next, an example of effect produced by Embodiments described above is illustrated. In the following description, although the effect will be described based on the specific configuration exemplified in Embodiments described above, the specific configuration may be replaced with other specific configurations exemplified in the specification of the present application as long as the similar effect is produced. That is, hereinafter, for the sake of convenience, although a sole specific configuration of the associated specific configurations may be described as a representative, the specific configuration may also be replaced with the other specific configurations to which the representatively described specific configuration.

Also, the replacement may be made across a plurality of Embodiments. In other words, the replacement may also be a case where the respective configurations whose examples are illustrated in different Embodiments are combined to produce the same effect.

According to Embodiments described above, the code adjustment device includes the loading unit 101, the code adjustment planning unit 102, and the code adjustment execution unit 103. The loading unit 101 loads a relocatable object file. The code adjustment planning unit 102 creates a code adjustment plan list using a plurality of elements, each of which is a pair of a position where a code adjustment is to be performed and a corresponding adjustment content in the object file loaded by the loading unit 101. After the code adjustment plan list is created, the code adjustment execution unit 103 executes a plurality of code adjustments based on the code adjustment plan list.

Also, according to Embodiments described above, the code adjustment device includes a processing circuit 1102A that executes a program, and storage device 1103 that stores the program to be executed. The following operations are implemented by the processing circuit 1102A executing the program.

That is, the relocatable object file is loaded. Then, the code adjustment plan list is created using a plurality of elements, each of which is a pair of a position where a code adjustment is to be performed and a corresponding adjustment content in the loaded object file. And, after the code adjustment plan list is created, a plurality of code adjustments are executed based on the code adjustment plan list.

Also, according to Embodiments described above, the code adjustment device includes a processing circuit 1102B, which is dedicated hardware. The processing circuit 1102B being dedicated hardware, performs the following operations.

That is, the processing circuit 1102B being dedicated hardware, loads the relocatable object file. And a code adjustment plan list is created using a plurality of elements, each of which is a pair of a position where a code adjustment is to be performed and a corresponding adjustment content in the loaded object file. And after the code adjustment plan list is created, a plurality of code adjustments are executed based on the code adjustment plan list.

According to such a configuration, adjustment is not executed while the code adjustment plan list is being created by the code adjustment planning unit 102; therefore, it is not necessary to stop the program being an adjustment target. Therefore, the stop time of the program can be shortened.

In the code adjustment planning unit 102, a process such as symbol search is performed in order to create the elements of the code adjustment plan list. This process takes a relatively long time. Meanwhile, the code adjustment execution unit 103 performs actual adjustment, that is, code rewriting based on the code adjustment plan list already created by the code adjustment planning unit 102. Therefore, the process in the code adjustment execution unit 103 can be ended in a relatively short time.

According to the embodiments described above, while executing the program to be updated (that is, an adjustment target), creation of the code adjustment plan list, which takes a relatively long time can be performed in parallel; therefore, the program to be updated (that is, an adjustment target) can be stopped only while the code adjustment execution unit 103 is rewriting the code that can be completed in a relatively short time. As a result, the stop time of the program due to the partial update of the program can be shortened.

What makes the creation of the code adjustment plan list by the code adjustment planning unit 102 in parallel with the execution of the program to be updated (that is, the adjustment target) possible is because the code adjustment planning unit 102 only creates a code adjustment plan list and does not actually rewrite the program.

It should be noted that the number of elements used for creating the code adjustment plan list may be plural, and it is not necessary to include all the elements to be adjusted. Also, the elements to be adjusted by the code adjustment execution unit 103 may not be all the elements in the code adjustment plan list, and only some elements in the code adjustment plan list may be adjusted.

In addition, even when other configurations whose examples are illustrated in the present specification of the present application are added to the above configurations as appropriate, that is, when other configurations in the present specification of the present application that are not mentioned as the above configurations are added as appropriate can produce a similar effect.

According to Embodiments described above, after the code adjustment plan list using all elements is created, a plurality of code adjustments are executed based on the code adjustment plan list. According to such a configuration, the code adjustment is executed after the code adjustment plan list for all the elements is created, so the time to stop the program can be effectively shortened.

Further, according to Embodiments described above, the code adjustment planning unit 102 creates the code adjustment plan list using the plurality of elements, each of which is a pair of an address indicating the position where code adjustment is to be performed and a value to be directly written as the adjustment content at a position indicated by the address. According to such a configuration, adjustment is not executed while the code adjustment plan list is being created by the code adjustment planning unit 102; therefore, it is not necessary to stop the program being an adjustment target. Therefore, the stop time of the program can be shortened.

Further, according to Embodiments described above, the code adjustment planning unit 102 creates the code adjustment plan list using only elements whose values change at positions where code adjustment is performed before and after code adjustment. According to such a configuration, information (elements) regarding code adjustment that does not need to be changed is not output to the code adjustment plan list. Therefore, even in the code adjustment execution unit 103 that performs adjustment using the code adjustment plan list, unnecessary code adjustment is suppressed.

Further, according to Embodiments described above, the code adjustment planning unit 102 creates the code adjustment plan list by excluding new elements which are elements to be newly added to positions where code adjustment is performed before and after code adjustment. According to such a configuration, the processing amount of the code adjustment execution unit 103 can be reduced by excluding the code adjustment of the part that does not affect the operation of the program in operation (that is, the code adjustment of the newly loaded code) from the code adjustment plan list is completed. As a result, the stop time of the program during the linking process can be shortened.

Also, according to Embodiments described above, the code adjustment execution unit 103 executes code adjustment based on the new elements before the creation of the code adjustment plan list is completed. According to such a configuration, the processing amount of the code adjustment execution unit 103 can be reduced by rewriting only the code adjustment of the part that does not affect the operation of the program in operation (that is, the code adjustment of the newly loaded code) in advance. As a result, the stop time of the program during the linking process can be shortened.

Further, according to Embodiments described above, the code adjustment device includes the host computer 100, which is a computer, and the target computer 1200, which is a computer different from the host computer 100. Here, the code adjustment planning unit 102 is provided in the host computer 100. The code adjustment execution unit 1204 is provided in the target computer 1200. According to such a configuration, the amount of data uploaded to the target computer 1200 when updating the program can be reduced. Therefore, the present technology is applicable even when updating a program of an embedded system with a relatively small amount of memory.

According to Embodiments described above, the code adjustment method loads a relocatable object file. And a code adjustment plan list is created using a plurality of elements, each of which is a pair of a position where a code adjustment is to be performed and a corresponding adjustment content in the loaded object file. And after the code adjustment plan list is created, a plurality of code adjustments are executed based on the code adjustment plan list.

According to such a configuration, adjustment is not executed while the code adjustment plan list is being created; therefore, it is not necessary to stop the program being an adjustment target. Therefore, the stop time of the program can be shortened.

Note that the order in which each process is performed can be changed unless otherwise specified.

In addition, even when other configurations whose examples are illustrated in the present specification of the present application are added to the above configurations as appropriate, that is, when other configurations in the present specification of the present application that are not mentioned as the above configurations are added as appropriate can produce a similar effect.

Modification of Embodiments Described Above

In Embodiments described above, although the dimensions, shape, relative arrangement relationship, implementation conditions, etc. of each component may be described, these elements are mere examples in all aspects, and shall not be limiting thereof.

Thus, it is understood that numerous other modification examples and equivalents not having been described can be devised without departing from the scope of the technique disclosed in the specification of the present application. For example, a case where modifying at least one component, a case where adding or omitting components, and further, a case where extracting at least one component in at least one Embodiment and combining it with a component of another Embodiment are included.

Further, "one or more" components may be included when described that "one" component is provided in Embodiments described above, so far as consistent with Embodiments Also, the descriptions in the present specification of the present application are referred for the every object related to the technique, and none of them are regarded as conventional techniques.

Each component described in Embodiments described above is also assumed as software or firmware, as well as corresponding hardware, and in both concepts, each component is referred to as a "unit" or "circuitry" or the like.

Further, the technology disclosed in the present specification of the present application, when each component is distributed in a plurality of devices, in other words, a form of a system as a combination of a plurality of devices may be adoptable.

EXPLANATION OF REFERENCE SIGNS 100 host computer, 101, 1203, 3001 loading unit, 102, 3002 code adjustment planning unit, 103, 1204, 3003 code adjustment execution unit, 104 relocatable object file, 105 global symbol table, 1102A, 1102B processing circuit, 1103 storage device, 1200 target computer, 1201 update data creation unit, 1202 update data.

The invention claimed is:

1. A code adjustment device comprising:
at least one processor to execute a program; and
at least one memory to store the program which, when it is executed by the processor, performs process of,
loading an object file that is relocatable;
creating a code adjustment plan list using a plurality of elements, each of which is a pair of a position where a code adjustment is to be performed and a corresponding adjustment content in the object file loaded and the already loaded object file; and,
executing a plurality of code adjustments based on the code adjustment plan list after the code adjustment plan list is created, wherein
creating the code adjustment plan list includes checking of whether or not a value changes at a position where the code adjustment is performed before and after the code adjustment and, creating the code adjustment plan list, and
creating the code adjustment plan list includes creating the code adjustment plan list by excluding new elements that is the elements newly added to positions where the code adjustment is performed before and after the code adjustment.

2. The code adjustment device according to claim 1, wherein,
executing the plurality of code adjustments includes, after the code adjustment plan list using all the elements is created, executing the plurality of code adjustments based on the code adjustment plan list.

3. The code adjustment device according to claim 1, wherein
creating the code adjustment plan list includes creating the code adjustment plan list using the plurality of elements, each of which is a pair of an address indicating a position where the code adjustment is to be performed and a value to be directly written as the adjustment content at a position indicated by the address.

4. The code adjustment device according to claim 1, wherein executing the plurality of code adjustments includes executing the code adjustment based on the new elements before creation of the code adjustment plan list is completed.

5. A code adjustment method, comprising:
loading an object file that is relocatable;
creating a code adjustment plan list using a plurality of elements, each of which is a pair of a position where a code adjustment is to be performed and a corresponding adjustment content in the loaded object file and the already loaded object file; and,
executing a plurality of code adjustments based on the code adjustment plan list after the code adjustment plan list is created, wherein
creating the code adjustment plan list includes checking of whether or not a value changes at a position where the code adjustment is performed before and after the code adjustment and, creating the code adjustment plan list, and
creating the code adjustment plan list includes creating the code adjustment plan list by excluding new elements that is the elements newly added to positions where the code adjustment is performed before and after the code adjustment.

6. A code adjustment device comprising:
at least one processor to execute a program; and
at least one memory to store the program which, when it is executed by the processor, performs process of,
loading an object file that is relocatable;
creating a code adjustment plan list using a plurality of elements, each of which is a pair of a position where a code adjustment is to be performed and a corresponding adjustment content in the object file loaded and the already loaded object file; and,
executing a plurality of code adjustments based on the code adjustment plan list after the code adjustment plan list is created, wherein
creating the code adjustment plan list includes checking of whether or not a value changes at a position where the code adjustment is performed before and after the code adjustment and, creating the code adjustment plan list,
creating the code adjustment plan list is performed in a host computer, and
creating the code adjustment plan list is performed in a target computer, which is a computer different from the host computer.

7. The code adjustment device according to claim 2, wherein,
executing the plurality of code adjustments includes, after the code adjustment plan list using all the elements is created, executing the plurality of code adjustments based on the code adjustment plan list.

8. The code adjustment device according to claim 2, wherein
creating the code adjustment plan list includes creating the code adjustment plan list using the plurality of elements, each of which is a pair of an address indicating a position where the code adjustment is to be performed and a value to be directly written as the adjustment content at a position indicated by the address.

9. The code adjustment device according to claim 3, wherein
creating the code adjustment plan list includes creating the code adjustment plan list using the plurality of elements, each of which is a pair of an address indicating a position where the code adjustment is to be performed and a value to be directly written as the adjustment content at a position indicated by the address.

10. A code adjustment method, comprising:
loading an object file that is relocatable;
creating a code adjustment plan list using a plurality of elements, each of which is a pair of a position where a code adjustment is to be performed and a corresponding adjustment content in the loaded object file and the already loaded object file; and,
executing a plurality of code adjustments based on the code adjustment plan list after the code adjustment plan list is created, wherein
creating the code adjustment plan list includes checking of whether or not a value changes at a position where the code adjustment is performed before and after the code adjustment and, creating the code adjustment plan list, and
creating the code adjustment plan list is performed in a host computer, and
creating the code adjustment plan list is performed in a target computer, which is a computer different from the host computer.

* * * * *